US011871843B2

(12) United States Patent
Abedijaberi et al.

(10) Patent No.: US 11,871,843 B2
(45) Date of Patent: Jan. 16, 2024

(54) SEALING CORNER BRACKET FOR RECEIVING TWO FRAME MEMBERS AND CABINET INCLUDING CORNER BRACKET

(71) Applicant: CORNING RESEARCH & DEVELOPMENT CORPORATION, Corning, NY (US)

(72) Inventors: Arash Abedijaberi, Painted Post, NY (US); William Julius McPhil Giraud, Azle, TX (US); Brian Duane Kingsbury, Watauga, TX (US); Robert Tomasz Klak, Zdunska Wola (PL); Przemyslaw Andrzej Kukian, Lodz (PL)

(73) Assignee: Corning Research & Development Corporation, Corning, NY (US)

( * ) Notice: Subject to any disclaimer, the term of this patent is extended or adjusted under 35 U.S.C. 154(b) by 123 days.

(21) Appl. No.: 17/536,255

(22) Filed: Nov. 29, 2021

(65) Prior Publication Data
US 2023/0165366 A1   Jun. 1, 2023
US 2023/0389697 A9   Dec. 7, 2023

Related U.S. Application Data

(63) Continuation of application No. PCT/US2019/036027, filed on Jun. 7, 2019.

(51) Int. Cl.
*A47B 47/00* (2006.01)
*F16B 12/44* (2006.01)

(52) U.S. Cl.
CPC .......... *A47B 47/0008* (2013.01); *F16B 12/44* (2013.01); *F16B 2012/446* (2013.01)

(58) Field of Classification Search
CPC ................. A47B 47/0008; F16B 12/44; F16B 2012/446; H02B 1/014; H02B 1/30;
(Continued)

(56) References Cited

U.S. PATENT DOCUMENTS 3,334,175 A   8/1967 Vincent
5,584,406 A * 12/1996 Besserer .................. F16M 1/00
312/265.2
(Continued)

FOREIGN PATENT DOCUMENTS

CN     205713767 U      11/2016
DE    102011012433   *   8/2012
(Continued)

OTHER PUBLICATIONS

EP1152506 English translation (Year: 2001).*
(Continued)

*Primary Examiner* — Janet M Wilkens

(57) ABSTRACT

A corner bracket may include first and second retainers configured to receive respective ends of first and second frame members, such that the first and second frame members are substantially perpendicular with respect to one another. The first and second retainers may include structural and sealing portions, wherein the structural portion includes a first material and the sealing portion includes a second material, with the first material being relatively more rigid than the second material, and the second material being relatively more elastic than the first material. The corner bracket may also include first and second exterior surfaces at least partially including the second material and first and second door panel interfaces configured to provide a seal between the first and second exterior surfaces and interior surfaces of first and second door panels in a closed position. The corner bracket may be incorporated into a frame for a cabinet.

23 Claims, 8 Drawing Sheets

(58) Field of Classification Search
CPC . H02B 1/38; H02B 1/012; H02B 1/28; H02B 1/301; G02B 6/4452; G02B 6/444; H04Q 1/025; H04Q 1/114
USPC .............. 312/296, 265.1–265.6, 140; 174/50
See application file for complete search history.

(56) References Cited

U.S. PATENT DOCUMENTS

| | | | | |
|---|---|---|---|---|
| 5,806,946 | A * | 9/1998 | Benner | H05K 7/183 |
| | | | | 312/265.5 |
| 5,848,500 | A * | 12/1998 | Kirk | G03D 17/00 |
| | | | | 403/231 |
| 6,102,498 | A * | 8/2000 | Kohler | H02B 1/28 |
| | | | | 312/223.1 |
| 10,443,885 | B2 * | 10/2019 | Son | F24F 3/044 |
| 2008/0174218 | A1 | 7/2008 | Leimkuehler et al. | |
| 2011/0050052 | A1 | 3/2011 | Elkins et al. | |
| 2012/0068586 | A1 | 3/2012 | Chen | |

FOREIGN PATENT DOCUMENTS

| | | | |
|---|---|---|---|
| EP | 1152506 | * | 11/2001 |
| WO | 2019108525 | * | 6/2019 |
| WO | 2019195110 | * | 10/2019 |

OTHER PUBLICATIONS

DE102011012433 English translation (Year: 2012).*
International Search Report and Written Opinion of the International Searching Authority; PCT/US2019/036027; dated Feb. 2, 2020; 11 pages; European Patent Office.

* cited by examiner

SEALING CORNER BRACKET FOR RECEIVING TWO FRAME MEMBERS AND CABINET INCLUDING CORNER BRACKET

PRIORITY APPLICATION

This application is a continuation of International Application No. PCT/US19/36027, filed on Jun. 7, 2019, the content of which is relied upon and incorporated herein by reference in its entirety.

DESCRIPTION

Background

Cabinets may be used to enclose and protect equipment, such as, for example, fiber optic equipment associated with fiber optic cables including optical fibers. For example, fiber optic equipment may be enclosed in cabinets and provide connections and circuitry for facilitating broadband voice, video, and data transmission. One example of a cabinet for enclosing fiber optic equipment is a fiber optic distribution outdoor cabinet, some of which may be intended to be installed in an outdoor environment exposed to the elements. In order to substantially prevent moisture and dust from the environment from entering the interior of the cabinet, some cabinets include a seamless single-piece shell. However, cabinets formed in such a manner may exhibit a number of possible drawbacks. For example, due at least in part to the single-piece shell construction, such cabinets are not scalable, and thus, cannot be easily assembled or modified in the field to increase (or reduce) the size of the cabinet to tailor the cabinet to meet the capacity requirements of the equipment being enclosed therein. Thus, it may be necessary to manufacture such cabinets in a large number of different sizes to meet the needs for different installations, which may result in manufacturing and inventory inefficiencies.

In addition, larger cabinets needed to meet large capacity requirements may be cumbersome to transport and install due to their large size and weight. Further, it may be difficult to repair or replace damaged portions of the cabinet due, at least in part, to having a single-piece construction and/or the possible need to disconnect any cables entering the cabinet when repairing the cabinet, which may result in additional complexity and expense.

Some examples described herein may address one or more of these possible drawbacks and/or other possible drawbacks.

BRIEF DESCRIPTION OF THE DRAWINGS

The detailed description is described with reference to the accompanying figures. The same reference numbers in different figures indicate similar or identical items.

DETAILED DESCRIPTION

Figure 1:
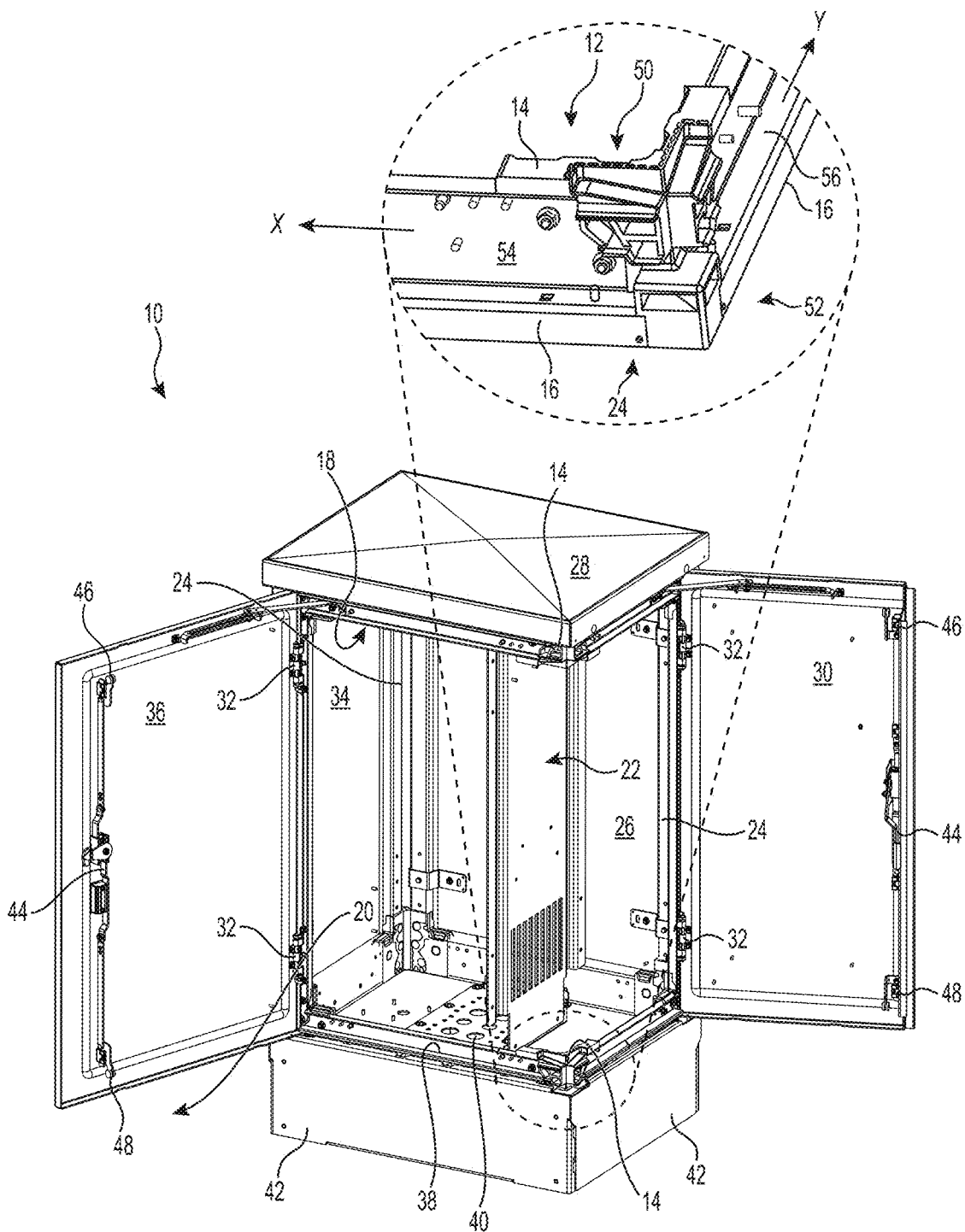
FIG. 1 is a schematic perspective view of an example cabinet including a detailed perspective view of an example corner joint including an example corner bracket coupling two example frame members to one another.

This disclosure relates to cabinets, and more particularly, to cabinets for housing equipment and including corner brackets for providing structural support and a seal providing resistance to entry of dust, dirt, and/or fluid between the corner brackets, frame members, panels, and/or door panels of the cabinet.

The present disclosure is generally directed to a corner bracket. The corner bracket may include a structural portion including at least one first material, and a sealing portion at least partially covering the structural portion and including at least one second material. The at least one first material may be relatively more rigid than the at least one second material, and the at least one second material may be relatively more elastic than the at least one first material. The corner bracket may also include a first retainer configured to receive an end of a first frame member, and the first retainer may at least partially include the at least one first material and may define a first longitudinal axis. The corner bracket may also include a second retainer coupled to the first retainer and defining a second longitudinal axis substantially perpendicular to the first longitudinal axis of the first retainer. The second retainer may be configured to receive an end of a second frame member, such that the first frame member and the second frame member are substantially perpendicular with respect to one another when respectively received by the first retainer and the second retainer. The second retainer may at least partially include the at least one first material. The corner bracket may also include a first exterior surface at least partially defined by the first retainer and at least partially including the at least one second material. The first exterior surface may include a first door panel interface configured to provide a seal between the first exterior surface of the corner bracket and an interior surface of a first door panel in a closed position. The corner bracket may also include a second exterior surface at least partially defined by the second retainer and at least partially including the at least one second material. The second exterior surface may include a second door panel interface configured to provide a seal between the second exterior surface of the corner bracket and an interior surface of a second door panel in a closed position, in which the first door panel interface and the second door panel interface may be substantially perpendicular with respect to one another.

This disclosure is also generally directed to a corner joint. The corner joint may include a first frame member defining a first longitudinal frame member axis, and a second frame member defining a second longitudinal frame member axis. The corner joint may also include a corner bracket coupling the first frame member and the second frame member to one another, such that the first frame member longitudinal axis and the second frame member longitudinal axis are substantially perpendicular with respect to one another when respectively received by the first retainer and the second retainer. The corner bracket may include a first retainer coupled to an end of the first frame member, and the first retainer may at least partially include at least one first material and may define a first longitudinal axis. The corner bracket may also include a second retainer coupled to the first retainer and defining a second longitudinal axis substantially perpendicular to the first longitudinal axis of the first retainer. The second retainer may be coupled to an end of the second frame member, such that the first frame member and the second frame member are substantially perpendicular with respect to one another when respectively received by the first retainer and the second retainer. The second retainer may at least partially include the at least one first material. The corner bracket may also include a first exterior surface at least partially defined by the first retainer and at least partially including at least one second material. The first exterior surface may include a first door panel interface configured to provide a first seal between the first exterior surface and an interior surface of a first door panel in a closed position, wherein the at least one first material is relatively more rigid than the at least one second material, and the at least one second material is relatively more elastic than the at least one first material. The corner bracket may also include a second exterior surface at least partially defined by the second retainer and at least partially including the at least one second material. The second exterior surface may include a second door panel interface configured to provide a second seal between the second exterior surface and an interior surface of a second door panel in a closed position, such that the first door panel interface and the second door panel interface are substantially perpendicular with respect to one another.

This disclosure is also generally directed to a frame defining an interior and an exterior. The frame may include an upper back frame member, an upper first side frame member coupled to upper back frame member at a first upper corner, and an upper front frame member. The frame may also include an upper corner bracket coupled to the upper first side frame member and the upper front frame member. The frame may also include a lower back frame member, a lower first side frame member coupled to the lower back frame member at a first lower corner, and a lower front frame member. The frame may also include a lower corner bracket coupled to the lower first side frame member and the lower front frame member. The frame may also include a first upright coupled to the upper back frame member and the upper first side frame member at the first upper corner, and a second upright coupled to the upper front frame member at an upper coupling location and the lower front frame member at a lower coupling location, wherein the upper coupling location is spaced from the upper corner bracket and the lower coupling location is spaced from the lower corner bracket. The frame may define an open space between the upper corner bracket and the lower corner bracket, such that the open space is devoid of any structural member extending between the upper corner bracket and the lower corner bracket. The upper corner bracket may include a first retainer coupled to an end of the upper first side frame member, and the first retainer may at least partially include at least one first material and may define a first longitudinal axis. The upper corner bracket also may include a second retainer coupled to the first retainer and may define a second longitudinal axis substantially perpendicular to the first longitudinal axis of the first retainer. The second retainer may be coupled to an end of the upper front frame member, such that the upper first side frame member and the upper front frame member are substantially perpendicular with respect to one another when respectively received by the first retainer and the second retainer. The second retainer may at least partially include the at least one first material. The upper corner bracket may also include a first exterior surface at least partially defined by the first retainer and at least partially including at least one second material. The first exterior surface may include a first door panel interface configured to provide a first seal between the first exterior surface and an interior surface of a first door panel in a closed position. The at least one first material may be relatively more rigid than the at least one second material, and the at least one second material may be relatively more elastic than the at least one first material. The upper corner bracket may also include a second exterior surface at least partially defined by the second retainer and at least partially including the at least one second material. The second exterior surface may include a second door panel interface configured to provide a second seal between the second exterior surface and an interior surface of a second door panel in a closed position, such that the first door panel interface and the second door panel interface are substantially perpendicular with respect to one another.

This disclosure is also generally directed to a cabinet defining an interior and an exterior. The cabinet may include a frame, for example, as described above. The cabinet may also include a back panel coupled to at least one of the upper back frame member, the first upright, or the lower back frame member. The cabinet may also include a top panel coupled to at least one of the upper back frame member, the upper first side frame member, or upper front frame member. The cabinet may also include a first hinge coupled to the first upright and providing a first pivot axis, and a second hinge coupled to the second upright and providing a second pivot axis. The cabinet may also include a first door panel coupled to the first hinge and configured to pivot about the first pivot axis between an open position permitting access to the interior of the cabinet and a closed position in which an interior side of the first door panel contacts the upper corner bracket, the lower corner bracket, and at least one of the upper first side frame member or the lower first side frame member. The cabinet may also include a second door panel coupled to the second hinge and configured to pivot about the second pivot axis between an open position permitting access to the interior of the cabinet and a closed position in which an interior side of the second door panel contacts the upper corner bracket, the lower corner bracket, and at least one of the upper front frame member or the lower front frame member.

Reference will now be made in detail to embodiments, examples of which are illustrated in the accompanying drawings. Whenever possible, the same reference numbers are used throughout the drawings to refer to the same or like parts.

As noted above, this disclosure is generally directed to cabinets, such as, for example, cabinets for housing equipment and including corner brackets for providing structural support and dust- and/or fluid-resistance between the corner brackets, frame members, panels, and/or door panels of the cabinet. According to some examples, the cabinets described herein may be assembled on site and may be scalable to meet the capacity requirements of the equipment being enclosed by the cabinet. For example, some examples of the cabinet may be formed by a frame assembled from frame members coupled to one another by brackets, including corner brackets. The frame members may be provided (or modified on-site) to build a frame (e.g., off-site or on-site) defining the desired interior dimensions, and the brackets may be used to couple the frame members to one another. Panels may be attached to the frame to create the cabinet. In some examples, one or more door panels may be pivotally coupled to the frame to provide one or more doors configured to pivot between open and closed positions.

In some examples, the cabinet may be devoid of an upright support at one or more corners of the cabinet, for example, such that the frame defines an open space between an upper corner bracket and a corresponding lower corner bracket. In some such examples, one or more door panels may be coupled to the cabinet, such that in an open position the one or more door panels pivot away from the corner of the cabinet devoid of the upright support, which may provide greater access to the interior of the cabinet, including, for example, access through the front and/or a side of the cabinet. This may provide ease of access to components in the interior of the cabinet that may not otherwise be accessible from the front of the cabinet.

In some examples, the equipment to be enclosed in the cabinet may be assembled and/or coupled to the interior of the cabinet during and/or after completion of assembly of the cabinet. In some examples, the corner brackets may provide both structural support for securely coupling two or more frame members to one another (e.g., rigidly coupling two frame members to one another) and a substantially dust- and/or fluid-resistant seal (e.g., a fluid-tight seal) between the corner bracket and the two or more frame members and, in some examples, between the brackets and the panels of the cabinet. Some examples may also at least partially provide a cabinet that is scalable to tailor its exterior size and/or interior size to meet the capacity needs of a particular installation due to the cabinet being formed as a frame with panels secured thereto, as compared to a cabinet including a monolithic shell having a size that cannot be easily altered. For example, brackets such as at least some of the example corner brackets disclosed herein may be used with frame members having different lengths (or different combinations of frame members and brackets) to create cabinets having different dimensions to meet the capacity needs of a particular installation. In addition, some examples may provide an ability to repair and/or replace portions of a cabinet, for example, by removing one or more of the panels and/or door panels from the frame and repairing and/or replacing the portions of the cabinet desired to be replaced and/or repaired. In addition, if the future requirements of a particular installation change, such that, for example, a larger interior space is desired to meet greater interior capacity requirements, some examples may provide the ability to be modified to increase the size of cabinet, for example, by removing some of the exterior panels, increasing the size of the frame to the desired size using frame members and brackets, and installing panels and/or door panels onto the modified frame to create a cabinet having the desired interior capacity.

FIG. 1 is a schematic perspective view of an example cabinet 10 including a detailed perspective view of an example corner joint 12 including an example corner bracket 14 coupling two example frame members 16 to one another. For example, the corner bracket 14 may be configured to couple two frame members 16 to one another without coupling a third frame member (e.g., an upright extending between two corresponding upper and lower corner brackets 14, for example, as explained herein). In some such examples, the corner brackets 14 may be configured to provide sufficient structural support for the corner joint 12 to maintain the desired structural integrity of the cabinet 10 without a third frame member providing support between the upper and lower corner brackets 14. In some examples, some of the corner brackets 14 may be configured to couple three frame members 16 (e.g., two upper or lower cross-members and one upright support extending between the upper and lower corner brackets 14).

The example cabinet 10 shown in FIG. 1 is a cabinet 10 for enclosing fiber optic equipment, such as fiber optic cables including optical fibers, and connections and circuitry for facilitating broadband voice, video, and data transmission. In some examples, the cabinet 10 may be a fiber optic distribution outdoor cabinet, which may be intended to be installed in an outdoor environment exposed to the elements. Other types of cabinets for enclosing other types of equipment are contemplated.

As shown in FIG. 1, the example cabinet 10 defines an interior 18 and an exterior 20. In the example shown, the interior 18 includes various structures 22 known to those skilled in the art for facilitating routing and/or connection of fiber optic cables including optical fibers (not shown for clarity). The example cabinet 10 shown includes a frame 24 and a plurality of exterior panels secured to the frame 24 for enclosing the interior 18 of the cabinet 10. For example, the cabinet 10 includes a back panel 26 coupled to a back side of the frame 24, a top panel 28 coupled to a top side of the frame 24, a first door panel 30 coupled to a first side of the frame 24 via one or more hinges 32, such that it pivots with respect to the frame 24, a second side panel 34 coupled to a second side of the frame 24 opposite the first door panel 30, a second door panel 36 coupled to a front side of the frame 24 via one or more hinges 32, such that it pivots with respect to the frame 24. In some examples, the cabinet 10 also includes a bottom panel 38 coupled to a bottom side of the frame 24. In some examples, the bottom panel 38 may include apertures 40 facilitating entry of cables, such as, for example, fiber optic cables, into the interior 18 of the cabinet 10. The example shown also includes a skirt 42 coupled to and extending around the periphery of the bottom of the frame 24.

Figure 8:
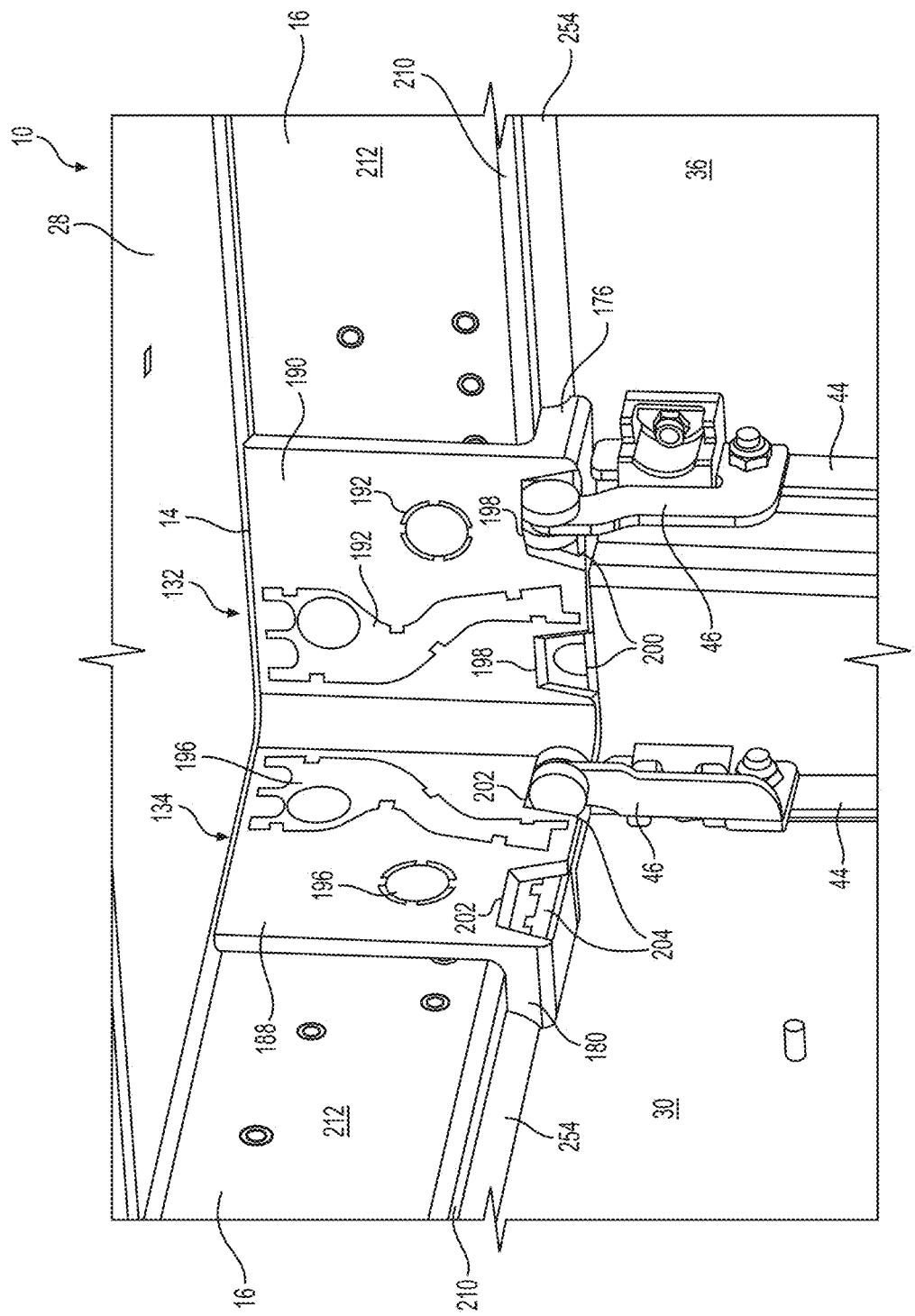
FIG. 8 is a schematic perspective view from an interior of an example cabinet showing an interior side of an example upper corner bracket and two example latch mechanisms, each including an example door latch engaging example recesses in the upper corner bracket.

As shown in FIG. 1, one or more of the first door panel 30 or the second door panel 36 may include a latch mechanism 44 for securing the first and/or second door panels 30 and 36 in the closed position, for example, as explained herein with respect to FIG. 8. In the example shown, each of the latch mechanisms 44 includes an upper door latch 46 and a lower door latch 48 configured to selectively engage and disengage the respective upper and lower corner brackets 14, for example, as explained herein.

As shown in FIG. 1, the frame 24 includes frame members 16 coupled to one another via brackets, including, for example, the example upper and lower corner brackets 14 shown. In some examples, the upper and lower corner brackets 14 may have substantially the same structure. In some examples, the upper and lower corner brackets 14 may differ from one another structurally. The example upper and lower corner brackets 14 shown each define an interior surface 50 and an exterior surface 52 and are configured to couple a first frame member 54 (e.g., a first cross member) having a first longitudinal axis X, and a second frame member 56 (e.g., a second cross member) having a second longitudinal axis Y, to one another, for example, such that the longitudinal axes X and Y are substantially perpendicular to one another. As used in this disclosure, "substantially" is used to account for minor deviations within manufacturing tolerances. For example, "substantially perpendicular" refers to being perpendicular or within normal manufacturing tolerances of being perpendicular. In other words, a perpendicular arrangement is intended even though there may be minor variations due to manufacturing tolerances.

Figure 2:
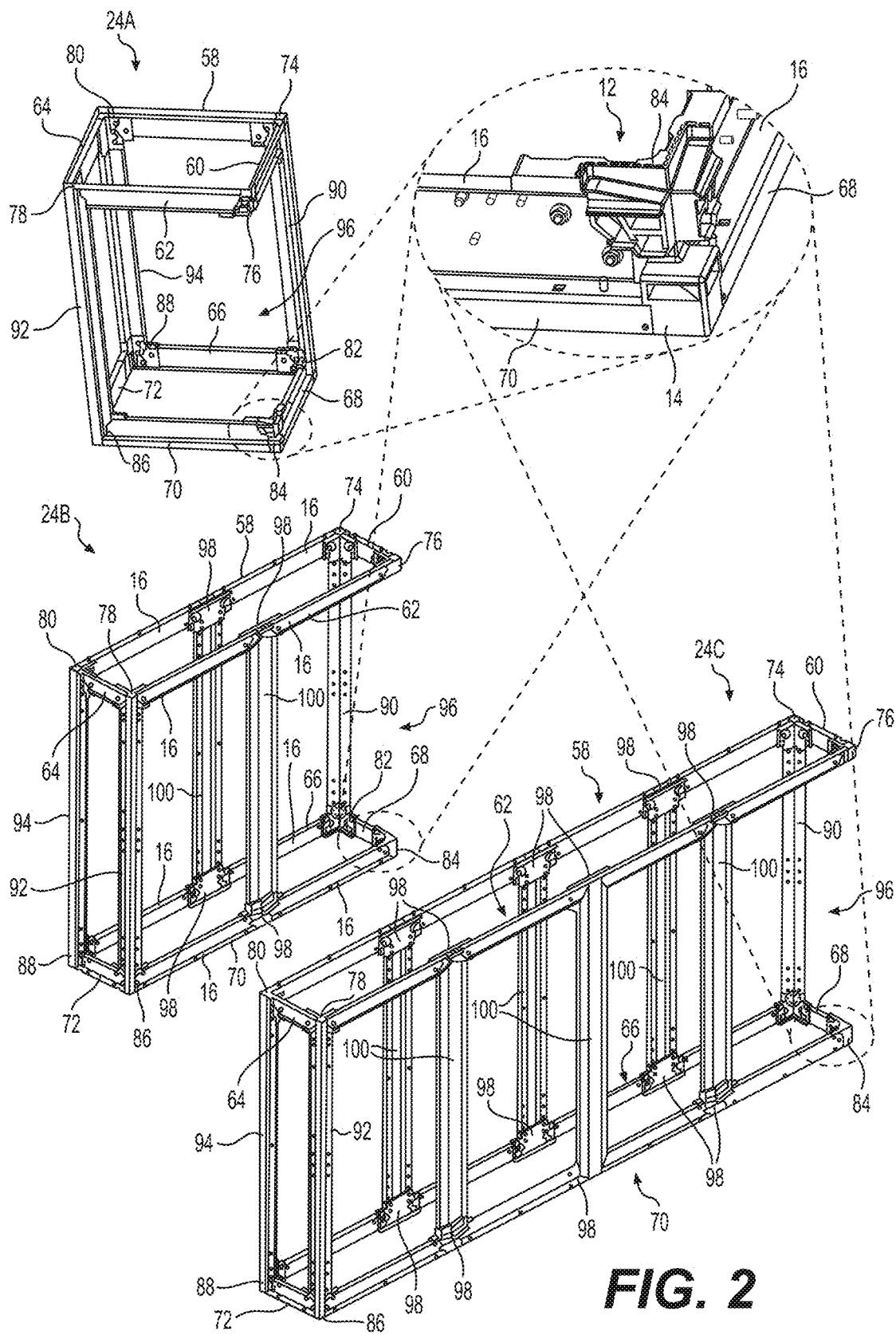
FIG. 2 is a schematic perspective view of example frames for respective cabinets including a detailed perspective partial section view of an example corner joint.

FIG. 2 is a schematic perspective view of three example frames 24A, 24B, and 24C for respective cabinets 10, including a detailed perspective partial section view of an example corner joint 12. As shown in FIG. 2, the example frame 24A may include an upper back frame member 58, an upper first side frame member 60, an upper front frame member 62, an upper second side frame member 64 opposite the upper first side frame member 60, a lower back frame member 66, a lower first side frame member 68, a lower front frame member 70, and a lower second side frame member 72 opposite the lower first side frame member 68. The example frame 24A also includes a first upper corner bracket 74 coupling the upper back frame member 58 and the upper first side frame member 60 to one another, a second upper corner bracket 76 (e.g., corner bracket 14) coupling the upper first side frame member 60 and the upper front frame member 62 to one another, a third upper corner bracket 78 coupling the upper front frame member 62 and the upper second side frame member 64 to one another, and a fourth upper corner bracket 80 coupling the upper second side frame member 64 and the upper back frame member 58 to one another. The example frame 24A further includes a first lower corner bracket 82 coupling the lower back frame member 66 and the lower first side frame member 68 to one another, a second lower corner bracket 84 (e.g., corner bracket 14) coupling the lower first side frame member 68 and the lower front frame member 70 to one another, a third lower corner bracket 86 coupling the lower front frame member 70 and the lower second side frame member 72 to one another, and a fourth lower corner bracket 88 coupling the lower second side frame member 72 and the lower back frame member 66 to one another.

In the example shown in FIG. 2, the frame 24A also includes a first corner frame member 90 (e.g., an upright) coupling the first upper corner bracket 74 and the first lower corner bracket 82 to one another, a third corner frame member 92 (e.g., an upright) coupling the third upper corner bracket 78 and third lower corner bracket 86 to one another, and a fourth corner frame member 94 (e.g., an upright) coupling the fourth upper corner bracket 80 and the fourth lower corner bracket 88 to one another. In the example shown, the example frame 24A is devoid of a second corner frame member (e.g., an upright) coupling the second upper corner bracket 76 and the second lower corner bracket 84 to one another. Such examples may result in defining an open space 96 between the second upper corner bracket 76 and the second lower corner bracket 84. This may result in the first door panel 30 and/or the second door panel 36 being coupled to the cabinet 10, such that in an open position, for example, as shown in FIG. 1, the first door panel 30 and/or the second door panel 36 pivot away from the corner of the cabinet 10 devoid of an upright support, which may provide greater access to the interior 18 of the cabinet 10, including, for example, access through the front and/or a side of the cabinet 10. This may provide ease of access to structures 22 (e.g., components and/or equipment) in the interior 18 of the cabinet 10 that may not otherwise be accessible from the front of the cabinet 10.

In some examples, additional brackets 98 and additional frame members (and/or frame members having a different length) may be used to increase the length of the frame 24A, provide coupling points for additional frame members (e.g., uprights 100) and/or provide structural support and/or dust- and/or fluid-resistant sealing structures (e.g., fluid-tight sealing structures) for one or more of the first door panel 30 or the second door panel 36. Use of brackets such as the corner brackets 14 and brackets 98 may facilitate expanding the length of the frame 24A. Such corner brackets 14 and/or brackets 98 may facilitate increasing the size of the cabinet 10, (e.g., on-site) without replacing the entire cabinet 10.

For example, an example lengthened frame 24B may include the upper back frame member 58 including a first frame member 16 and a second frame member 16 coupled to one another by a bracket 98, the upper first side frame member 60, the upper front frame member 62 including a first frame member 16 and a second frame member 16 coupled to one another by a bracket 98, the upper second side frame member 64 opposite the upper first side frame member 60, the lower back frame member 66 including a first frame member 16 and a second frame member 16 coupled to one another by a bracket 98, the lower first side frame member 68, the lower front frame member 70 including a first frame member 16 and a second frame member 16 coupled to one another by a bracket 98, and a lower second side frame member 72 opposite the lower first side frame member 68. The example frame 24B also includes the first upper corner bracket 74 coupling the upper back frame member 58 and the upper first side frame member 60 to one another, a second upper corner bracket 76 (e.g., corner bracket 14) coupling the upper first side frame member 60 and the upper front frame member 62 to one another, a third upper corner bracket 78 coupling the upper front frame member 62 and the upper second side frame member 64 to one another, and a fourth upper corner bracket 80 coupling the upper second side frame member 64 and the upper back frame member 58 to one another. The example frame 24B further includes a first lower corner bracket 82 coupling the lower back frame member 66 and the lower first side frame member 68 to one another, a second lower corner bracket 84 (e.g., corner bracket 14) coupling the lower first side frame member 68 and the lower front frame member 70 to one another, a third lower corner bracket 86 coupling the lower front frame member 70 and the lower second side frame member 72 to one another, and a fourth lower corner bracket 88 coupling the lower second side frame member 72 and the lower back frame member 66 to one another.

In the example shown in FIG. 2, the example frame 24B also includes the first corner frame member 90 (e.g., an upright) coupling the first upper corner bracket 74 and the first lower corner bracket 82 to one another, the third corner frame member 92 (e.g., an upright) coupling the third upper corner bracket 78 and third lower corner bracket 86 to one another, and the fourth corner frame member 94 (e.g., an upright) coupling the fourth upper corner bracket 80 and the fourth lower corner bracket 88 to one another. Similar to the example frame 24A, example frame 24B is devoid of a second corner frame member (e.g., an upright) coupling the second upper corner bracket 76 and the second lower corner bracket 84 to one another, for example, as described herein. The example frame 24B also includes additional frame members 100 (e.g., uprights) to provide additional support for the cabinet in which frame 24B is incorporated.

As shown in FIG. 2, the example frame 24C has been lengthened relative to the example frame 24B described above. For example, the length of the frame 24C has been doubled relative to the length of the example frame 24B by using additional pairs of brackets at least similar to the example brackets 98 to effectively connect two of the example frames 24B to one another in an end-to-end fashion. In addition, the example frame 24C also includes additional frame members 100 (e.g., uprights) to provide additional support for the cabinet in which the frame 24C is incorporated. In this example manner, the brackets and frame members 16 may be used to create frames 24 of different dimensions, for example, in the length, height, and/or width dimensions.

In some examples, one or more of the corner brackets 14 may include a structural portion including at least one first material, and a sealing portion including at least one second material different than the at least one first material. In some examples, the at least one first material is relatively more rigid than the at least one second material, and the at least one second material is relatively more elastic than the at least one first material. For example, the at least one first material may be sufficiently rigid to rigidly secure the frame members 16 to one another, such that the frame 24 provides a structural support to which the panels and/or door panels of the cabinet 10 (see FIG. 1) may be secured. In some examples, it may be desirable for the frame 24 to be sufficiently rigid to support the weight of the cabinet 10 and the equipment enclosed therein, and/or to prevent flexing of the frame 24 sufficient to compromise a substantially dust- and/or fluid-resistant seal (e.g., a fluid-tight seal) between the frame members of the frame 24 and the panels and/or door panels coupled to the frame 24. In some examples, the at least one first material may include one or more of steel, stainless steel, aluminum, titanium, platinum, fiber reinforced plastic, carbon fiber, or any other suitable strong and rigid material(s). In some examples, the at least one second material may be sufficiently elastic to provide a substantially dust- and/or fluid-resistant seal (e.g., a fluid-tight seal) between the corner brackets 14, the frame members 16, the panels, and/or door panels. In some examples, the at least one second material may include one or more of natural and/or synthetic rubbers and plastics. In some examples, the at least one second material may have a Shore A durometer ranging from, for example, about 10 to about 50, although other ranges are contemplated. In some examples, the structural portion 102 is formed as a single unitary piece. As described above, the first material is more rigid (higher Shore A durometer value) than the second material and the second material is more elastic (lower durometer value) than the first material.

Figure 3A:
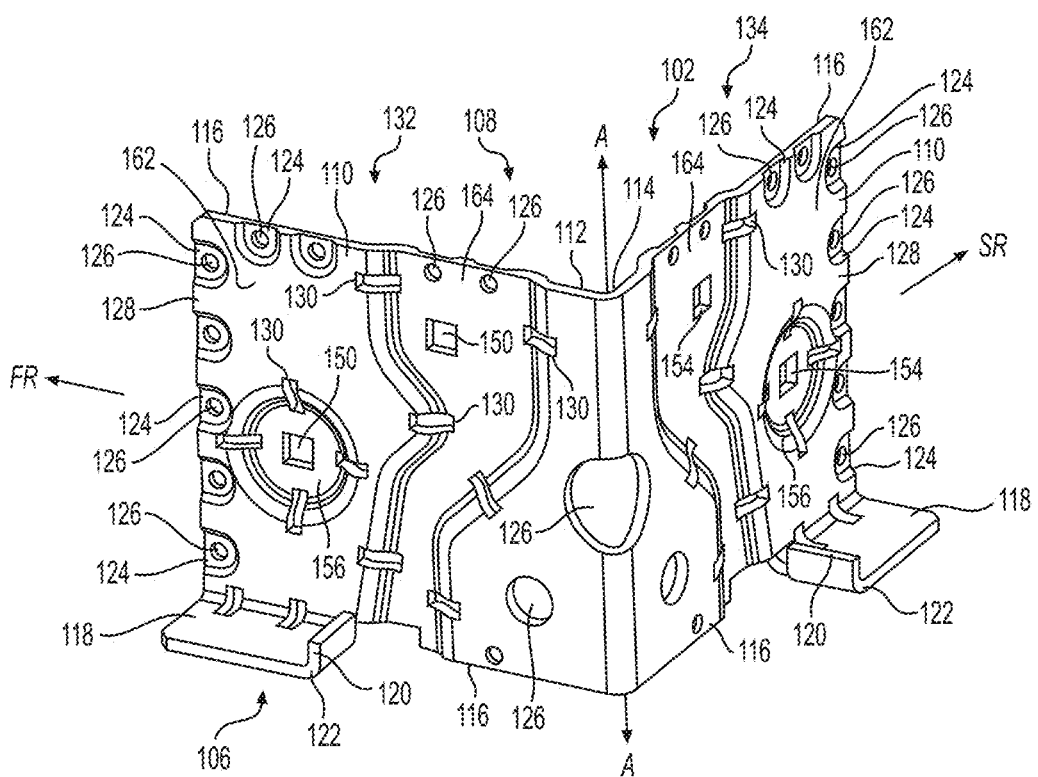
FIG. 3A is a schematic perspective view from an exterior side of an example structural portion of an example corner bracket.
Figure 3B:
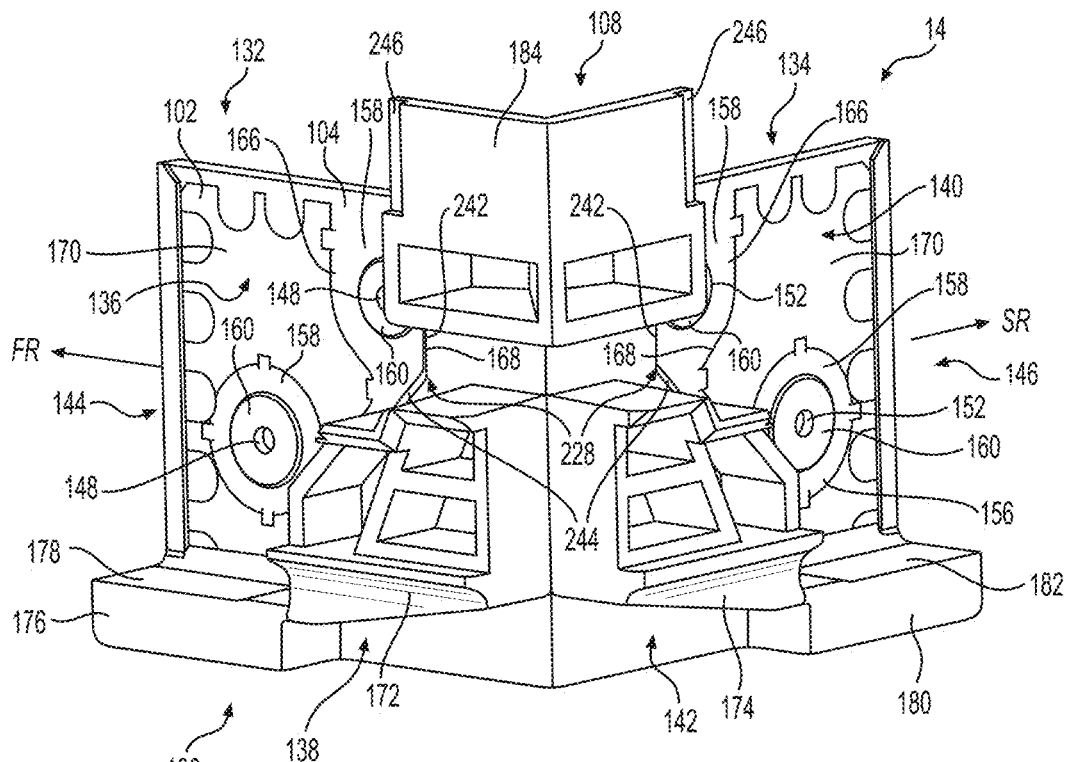
FIG. 3B is a schematic perspective view from an exterior side of an example corner bracket including the example structural portion shown in FIG. 3A with an example sealing portion partially covering the structural portion.
Figure 3C:
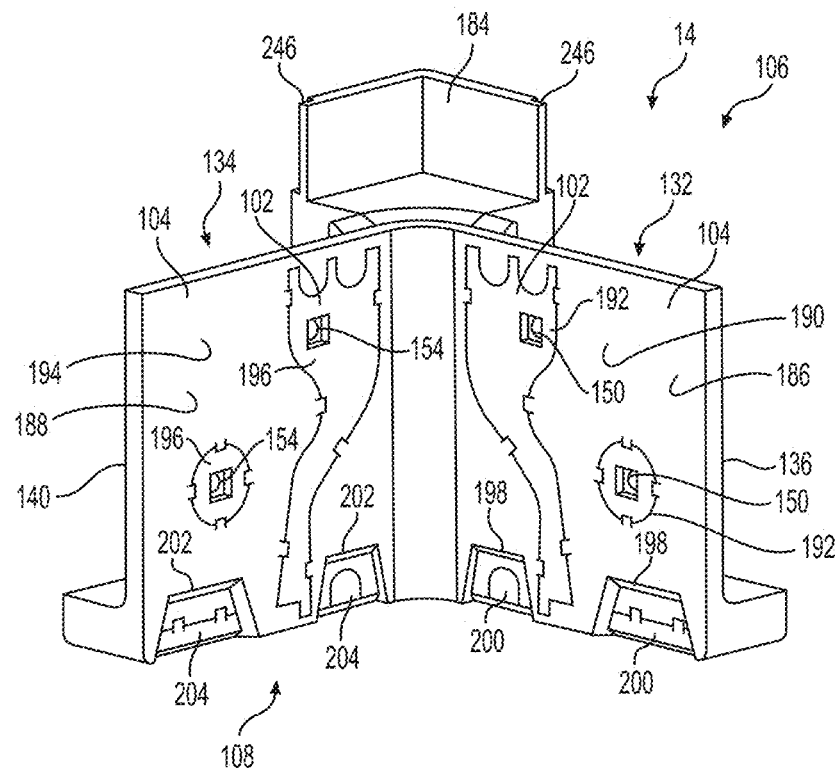
FIG. 3C is a schematic perspective view from an interior side of an example corner bracket including the example structural portion shown in FIG. 3A with an example sealing portion partially covering the structural portion.
Figure 3D:
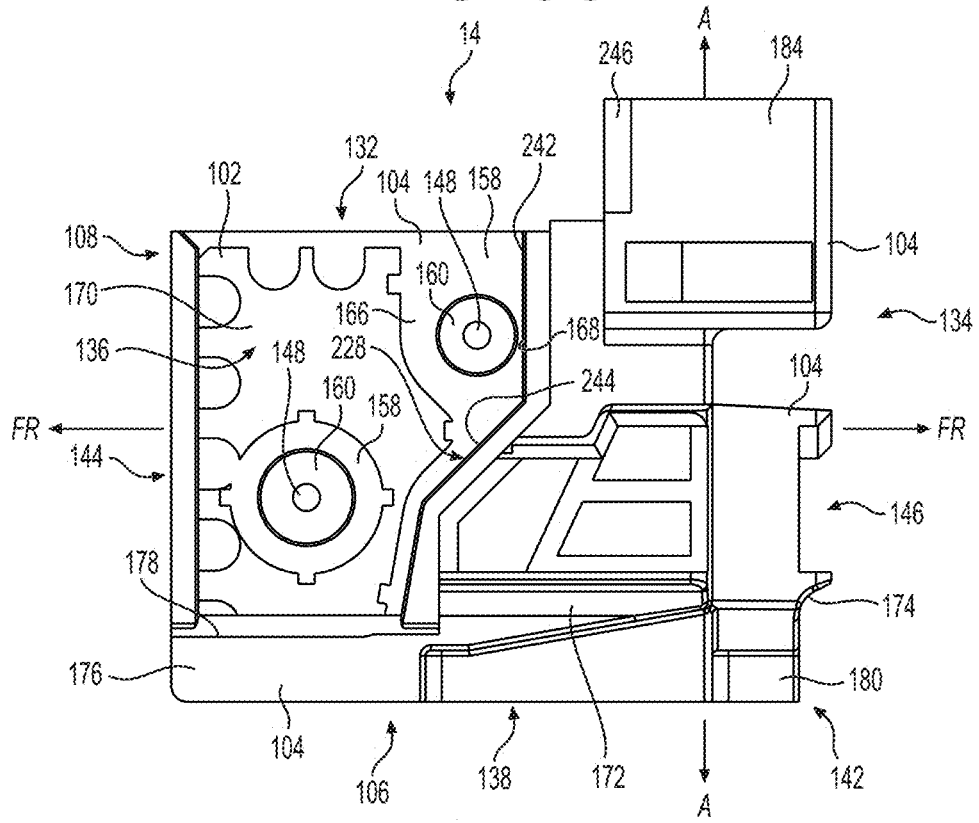
FIG. 3D is a schematic front side view from an exterior side of the example corner bracket shown in FIG. 3B including an example retainer configured to receive an end of a frame member.

For example, FIG. 3A is a schematic perspective view from an exterior side 106 of an example structural portion 102 of an example corner bracket 14. FIG. 3B is a schematic perspective view from the exterior side 106 of an example corner bracket 14, including the example structural portion 102 shown in FIG. 3A, with an example sealing portion 104 partially covering the structural portion 102. FIG. 3C is a schematic perspective view from an interior side 108 of the example corner bracket 14 shown in FIG. 3B, including the example structural portion 102 shown in FIG. 3A with the example sealing portion 104 partially covering the structural portion 102. FIG. 3D is a schematic front side view from the exterior side 106 of the example corner bracket 14 shown in FIG. 3B including an example retainer configured to receive an end of a frame member 16, for example, as explained below.

In some examples, the structural portion 102 may be formed as a single unitary piece, for example, as shown in FIG. 3A. In the example shown in FIG. 3A, the structural portion 102 exhibits substantial bi-lateral symmetry with two halves 110 coupled to one another at a bend 112 forming an apex 114 defining an apex axis A. In the example shown, the bend 112 is ninety degrees, such that the two halves 110 are substantially perpendicular with respect to one another, although other bend angles are contemplated. In the example shown, each of the halves 110 includes a substantially rectangular, substantially planar plate. In some examples, each of the halves 110 may define a lateral edge 116 to which a flange 118 is coupled and extends outward toward the exterior side 106 of the structural portion 102. In some examples, a lip 120 extends from an edge 122 of the flange 118 in a direction substantially parallel to the apex axis A. The flanges 118 may provide support for corresponding portions of the sealing portion 104, for example, as explained with respect to FIG. 3B.

As shown in FIG. 3A, the structural portion 102 may include a plurality of recesses 124, holes 126, and/or other structures configured to improve the coupling/bonding of the at least one second material of the sealing portion 104 to the structural portion 102. For example, in some examples, a series of recesses 124 and holes 126 are provided along terminal edges 128 and lateral edges 116 of the structural portion 102 to assist with securing the sealing portion 104 to the terminal edges 128 and lateral edges 116 of the structural portion. In addition, in some examples, the structural portion 102 may include a hole 126 at the apex 114 as well as holes 126 spaced from and adjacent the apex 114 for securing the sealing portion 104 to the structural portion 102.

Figure 4:
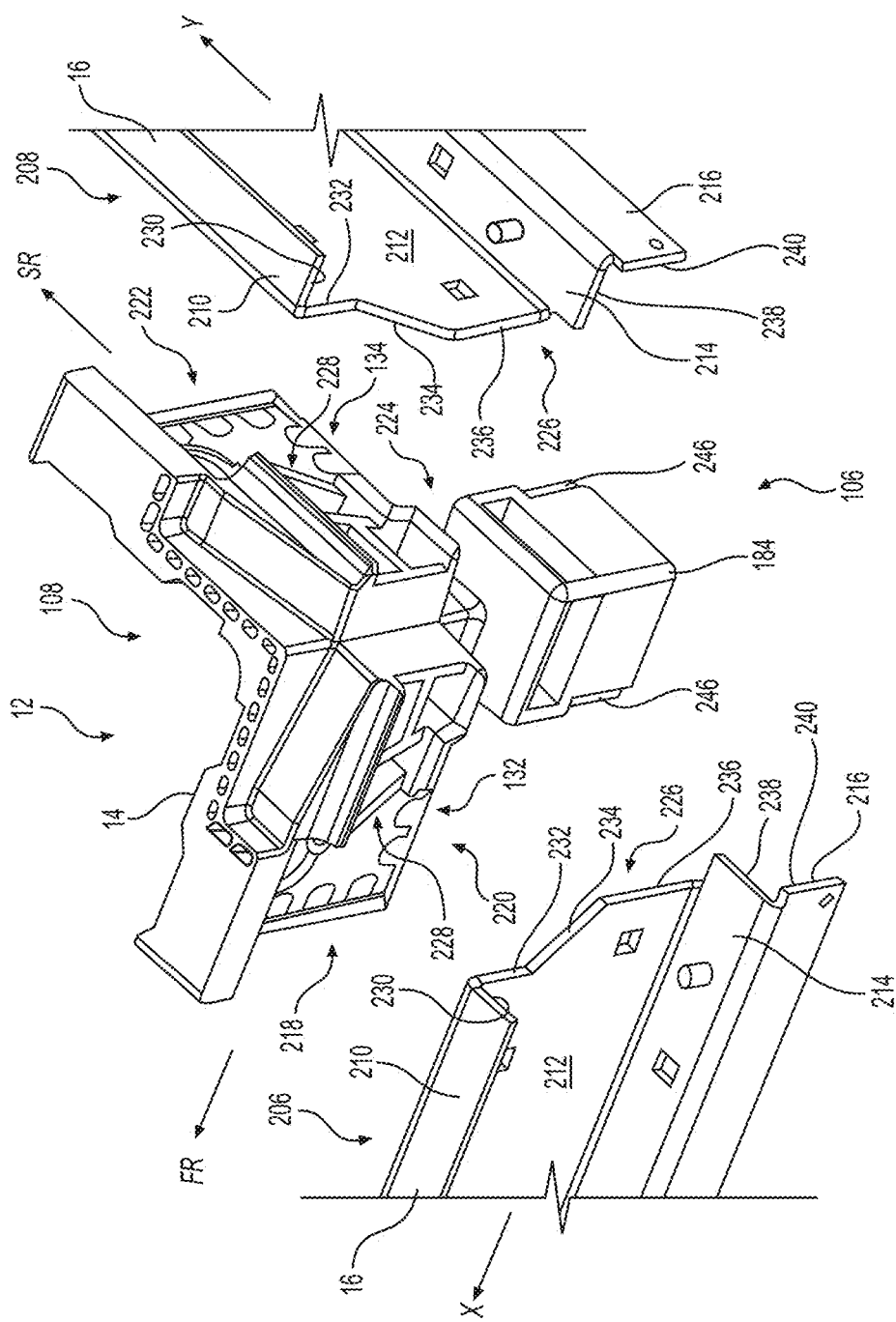
FIG. 4 is a schematic perspective exploded view of an example corner joint including an example lower corner bracket coupling two example frame members to one another.

As shown in FIGS. 3A, 3B, and 3D, the example corner bracket 14 includes a first retainer 132 configured to receive an end of a first frame member 16 (see FIGS. 2 and 4). In some examples, the first retainer 132 includes a portion of the structural portion 102 and a portion of the sealing portion 104 corresponding to a first half 110 of the structural portion 102, and defines a first longitudinal axis FR. The corner bracket 14 also includes a second retainer 134 coupled to the first retainer 132 and defining a second longitudinal axis SR substantially perpendicular to the first longitudinal axis FR of the first retainer 132. In some examples, the second retainer 134 is configured to receive an end of a second frame member 16 (see FIGS. 2 and 4), such that the first frame member 16 and the second frame member 16 are substantially perpendicular with respect to one another. In the example shown, the second retainer 134 includes a portion of the structural portion 102 and a portion of the sealing portion 104, for example, corresponding to a second half 110 of the structural portion 102.

In the example corner bracket 14 shown in FIGS. 3A, 3B, and 3D, the first retainer 132 defines a first exterior surface 136 including a portion of the sealing portion 104. In some examples, the first exterior surface 136 may include a first door panel interface 138 configured to provide a seal between the first exterior surface 136 and an interior surface of a first door panel 30 in a closed position. The second retainer 134 may define a second exterior surface 140 including a portion of the sealing portion 104. In some examples, the second exterior surface 140 may include a second door panel interface 142 configured to provide a seal between the second exterior surface 140 and an interior surface of a second door panel 36 in a closed position (see FIG. 5), for example, such that the first door panel 30 and the second door panel 36 are substantially perpendicular with respect to one another.

As shown in FIGS. 3B and 3D, the first retainer 132 of the example corner bracket 14 includes a first frame member interface 144 configured to be coupled to an end of a first frame member 16 (see FIG. 4), and the second retainer 134 includes a second frame member interface 146 configured to be coupled to an end of a second frame member 16 (see FIG. 4). In some examples, the first frame member interface 144 may include one or more first apertures 148, each configured to receive a fastener (see, e.g., FIGS. 7A and 7B) for coupling a first frame member 16 to the first frame member interface 144. As shown in FIG. 3A, the structural portion 102 may include corresponding first apertures 150 (e.g., two first apertures 150) in a half 110 corresponding the first retainer 132. The second frame member interface 146 may also include one or more second apertures 152, each configured to receive a fastener (see, e.g., FIGS. 7A and 7B) for coupling a second frame member 16 to the second frame member interface 146. As shown in FIG. 3A, the structural portion 102 may include corresponding second apertures 154 (e.g., two second apertures 154) in a half 110 corresponding the second retainer 134. In some examples, as shown, the first and/or second apertures 150 and 154 in the structural portion 102 may have a square-shaped cross-section, for example, to engage with complimentary portions of carriage bolts (not shown).

As shown in FIG. 3A, the structural portion 102 may include a recess 156 surrounding one or more of the apertures 150 and 154. In some examples, the recesses 156 may be configured to receive the at least one second material of the sealing portion 104, for example, to provide an improved seal between the corner bracket 14 and the frame members 16, for example, as described with respect to FIGS. 7A and 7B. In some examples, the sealing portion 104 at least partially surrounds (e.g., completely surrounds) the respective aperture and is configured to provide a fastener seal 158 between the respective aperture and the corresponding frame member. In some examples, for example as shown in FIGS. 3B and 3D, the sealing portion 104 includes a raised portion 160 surrounding the apertures to provide an improved seal.

As shown in FIG. 3A, in some examples of the structural portion 102, the first retainer 132 and/or the second retainer 134 may define a face 162 defining a channel 164 extending substantially perpendicular to the first longitudinal axis (or substantially parallel to the apex axis A). The channel 164 may provide a space for receiving the at least one second material of the sealing portion 104, which forms a compressible seal face 166 (see FIGS. 3B and 3D) configured to provide a seal between the first retainer 132 and/or the second retainer 134 and the respective frame members 16. As shown in FIGS. 3B and 3D, in some examples, the compressible seal face 166 may provide a sealing ridge 168 including the at least one second material of the sealing portion 104, wherein the sealing ridge 168 is configured to be compressed by the end of the corresponding frame member 16 received in the respective first retainer 132 and second retainer 134, for example, as explained in more detail with respect to FIG. 4.

As shown in FIG. 3A, the example structural portion 102 also includes a plurality of rectangular recesses/holes 130 associated with the recesses 156 for the fastener seals 158 (FIG. 3B) and the channels 164 for the seal faces 166 (FIGS. 3B and 3D). The rectangular recesses/holes 130 provide a more secure bonding between the at least one second material of the sealing portion 104 and the structural portion 102 at the recesses 156 and the channels 164.

As shown in FIGS. 3B and 3D, at least a portion of the face 162 may include a structural face 170 at least substantially devoid of the at least one second material of the sealing portion 104. The structural face 170 may provide a first rigid support configured to abut a portion of the respective frame member 16 received by the first retainer 132 and/or the second retainer 134, for example, when fasteners coupling the frame members 16 to the corner bracket 14 are tightened, for example, as described with respect to FIGS. 7A and 7B. In some examples, for example, as shown in FIGS. 3B and 3D, the sealing portion 104 may extend along the lateral edges 116 and the terminal edges 128 of the structural portion 102, and in combination with the structural face 170 and the fastener seals 158 and sealing ridges 168, provide a rigid coupling between the frame members 16 and the corner bracket 14 in combination with providing a substantially dust- and/or fluid-resistant seal between the frame members 16 and the corner bracket 14.

As shown in FIGS. 3B and 3D, the first exterior surface 136 may define a first drainage channel 172 configured to drain fluid away from the interior side 108 of the corner bracket 14, for example, opposite the first exterior surface 136. In some examples, the second exterior surface 140 may define a second drainage channel 174 configured to drain fluid away from the interior side 108 of the corner bracket 14, for example, opposite the second exterior surface 140. In some examples, the first drainage channel 172 and/or the second drainage channel 174 may define an obliquely extending trough configured to at least partially receive a flange on a respective interior side of a door panel, and fluid reaching the first drainage channel 172 and/or the second drainage channel 174 may be directed along the respective flange of the door panel, so that it can flow away from the interior 18 of the cabinet 10.

As shown in FIGS. 3B and 3D, in some examples, the corner bracket 14 may also include a first flange seal 176 at an end of the corner bracket 14 adjacent a first end of the apex 114, and the first flange seal 176 may define a first flange seal surface 178 including the at least one second material of the sealing portion and configured to receive and provide a seal with a portion of an end of a first frame member 16. For example, the first flange seal 176 may include the flange 118 (see FIG. 3A), which provides support for the at least one second material of the sealing portion 104, so that the at least one second material of the first flange seal 176 may be compressed by the respective frame member 16 coupled to the first retainer 132, thereby improving the seal formed therebetween. In some examples, the corner bracket 14 may also include a second flange seal 180 at an end of the corner bracket 14 adjacent the first end of the apex 114, and the second flange seal 180 may define a second flange seal surface 182 including the at least one second material of the sealing portion 104 and configured to receive and provide a seal with a portion of an end of a second frame member 16. For example, the second flange seal 180 may include the flange 118 (see FIG. 3A), which provides support for the at least one second material of the sealing portion 104, so that the at least one second material of the second flange seal 180 may be compressed by the respective frame member 16 coupled to the second retainer 134, thereby improving the seal therebetween.

As shown in FIGS. 3B and 3D, the corner bracket 14 may also include a flange receiver 184 at a second end of the apex 114 opposite the first end of the apex 114. In some examples, the flange receiver 184 may be configured to provide a seal between a portion of an end of a first frame member 16 and a seal between a portion of an end of a second frame member 16, for example, as described with respect to FIG. 4.

FIG. 3C is a schematic perspective view from an interior side 108 of the example corner bracket 14 shown in FIG. 3B. In the example shown, the first retainer 132 includes a first interior surface 186 opposite the first exterior surface 136, and the second retainer 134 defines a second interior surface 188 opposite the second exterior surface 140. In the example shown, the first interior surface 186 includes a first interior side sealing face 190 including the at least one second material of the sealing portion 104. In some examples, the first interior side sealing face 190 defines first fastener clearance portions 192 surrounding the apertures 150 in the first retainer 132. The first fastener clearance portions 192 are substantially devoid of the at least one second material of the sealing portion 104 and are configured to receive respective fastener heads of the fasteners, such that the fastener head contacts the respective first fastener clearance portion 192, for example, to provide a rigid engagement between the fastener head and the structural portion 102, for example, as explained with respect to FIGS. 7A and 7B.

Similarly, the second interior surface 188 includes a second interior side sealing face 194 including the at least one second material of the sealing portion 104. In some examples, the second interior side sealing face 194 defines second fastener clearance portions 196 surrounding the apertures 154 in the second retainer 134. The second fastener clearance portions 196 are substantially devoid of the at least one second material of the sealing portion 104 and are configured to receive respective fastener heads of the fasteners, such that the fastener head contacts the respective second fastener clearance portion 196, for example, to provide a rigid engagement between the fastener head and the structural portion 102, for example, as explained with respect to FIGS. 7A and 7B.

As shown in FIG. 3C, the example first interior surface 186 defines one or more first latch recesses 198 in the sealing portion 104 exposing respective first latch receivers 200 defined by the structural portion 102 and configured to receive a first door latch coupled to a first door panel, for example, as described herein with respect to FIG. 8. In some examples, the second interior surface 188 defines one or more second latch recesses 202 in the sealing portion 104 exposing respective second latch receivers 204 defined by the structural portion 102 and configured to receive a second door latch coupled to a second door panel, for example, as described herein with respect to FIG. 8.

FIG. 4 is a schematic perspective exploded view of an example corner joint 12 including an example corner bracket 14 coupling two example frame members 16 to one another to form the corner joint 12. For example, the frame members 16 include a first frame member 206 and a second frame member 208 defining respective longitudinal axes X and Y that are substantially perpendicular with respect to one another when coupled to the example corner bracket 14. In the example shown, the first frame member 206 and the second frame member 208 have substantially the same cross-section (e.g., the same size and/or shape taken perpendicular with respect to the respective longitudinal axes X and Y). For example, each of the first and second frame members 206 and 208 includes an upper flange 210 (e.g., a substantially planar flange) configured to extend away from the exterior side 106 of the corner bracket 14 when coupled to the corner bracket 14. Each of the first and second frame members 206 and 208 also includes a web 212 (e.g., a substantially planar web) configured to extend in a direction substantially perpendicular to the upper flange 210, and a lower flange 214 configured to extend away from the exterior side 106 of the corner bracket 14 when coupled to the corner bracket 14, for example, in a direction substantially parallel to the upper flange 210. In the example shown, the first and second frame members 206 and 208 also include a remote flange 216 (e.g., a substantially planar flange) extending from a terminal end of the lower flange 214 in direction substantially parallel to the web 212 and away from the upper flange 210.

Although the corner bracket 14, the first frame member 206, the second frame 208, and related structures are sometimes described herein including terminology related to upper, lower, and lateral relationships, which may imply absolute orientations and/or relationships, these descriptions should not be interpreted in a manner to necessarily require absolute relationships, but rather, they should be interpreted in manner consistent with relative orientations and relationships.

As shown in FIG. 4, the example corner bracket 14 includes an example first retainer 132 defining a first longitudinal axis FR and receiving an end of the first frame member 206. In some examples, the first retainer 132 may include a first retainer portion 218 configured to be coupled to the end of the first frame member 206, and a first sealing interface 220 configured to provide a substantially dust- and/or fluid-resistant seal (e.g., a fluid-tight seal) between a portion of the end of the first frame member 206 and the first retainer 132. The example corner bracket 14 also includes an example second retainer 134 defining a second longitudinal axis SR transverse to the first longitudinal axis FR of the first retainer 132 and configured to receive an end of the second frame member 208. In some examples, the second retainer 134 may include a second retainer portion 222 configured to be coupled to the end of the second frame member 208, and a second sealing interface 224 configured to provide a substantially dust- and/or fluid-resistant seal (e.g., a fluid-tight seal) between a portion of the end of the second frame member 208 and the second retainer 134.

As shown in FIG. 4, the structural portion 102 may include the first retainer portion 218 and/or the second retainer portion 222. In some examples, the sealing portion 104 may include the first sealing interface 220 and/or the second sealing interface 224. In some examples, the sealing portion 104 may at least partially encase the structural portion 102, for example, as described herein. For example, the sealing portion 104 may be over-molded onto the structural portion 102. Other manufacturing techniques are contemplated.

As shown in FIG. 4, the first retainer portion 218 may include an example first frame member interface 144 (see FIGS. 3B and 3D) presenting an abutment surface facing outward away from the exterior side 106 of the first retainer 132. In some examples, the first retainer portion 218 may include the one or more first apertures 148 (see FIGS. 3B and 3D) extending through the first retainer portion 218 configured to receive fasteners (e.g., screws and/or bolts (see FIGS. 5, 6, 7A, and 7B)) configured to secure the end of the first frame member 206 to the first retainer portion 218. In some examples, the second retainer portion 222 may include an example second frame member interface 146 (see FIGS. 3B and 3D) presenting an abutment surface facing outward away from the exterior side 106 of the second retainer 134. In some examples, the second retainer portion 222 may include the one or more second apertures 152 (see FIGS. 3B and 3D) extending through the second retainer portion 222 configured to receive fasteners (e.g., screws and/or bolts (see FIGS. 5, 6, 7A, and 7B)) configured to secure the end of the second frame member 208 to the second retainer portion 222. In some examples, the apertures 148 and/or 152 may have a square-shaped cross-section configured to engage with a complimentary portion of a carriage bolt (not shown). In some examples, devices and/or methods other than fasteners may be used to couple the first frame member 206 and/or the second frame member 208 to the corner bracket 14. In some examples, by attaching the frame members (e.g., directly) to the structural portion 102, the frame members may be rigidly coupled to one another, with the structural portion 102 substantially maintaining the relative angles and/or relative positions between the frame members.

As shown in FIG. 4, in some examples of the first and second frame members 206 and 208, the ends define an edge profile 226, and the sealing portion 104 of first retainer 132 and the second retainer 134 may each define a seal stop 228 (see FIGS. 3B and 3D) complementary to the edge profile 226 of the first and second frame members 206 and 208, respectively. The seal stop 228 may be configured to receive the edge profile 226 of the respective first or second frame members 206 and 208. For example, the edge profile 226 may define an upper edge 230 corresponding to the upper flange 210, a first edge portion 232 corresponding to a first portion of the web 212, a second edge portion 234 corresponding to a second portion of the web 212 and extending obliquely with respect to the first edge portion 232, a third edge portion 236 corresponding to a third portion of the web 212 and extending offset and substantially parallel relative to the first edge portion 232, a lower edge 238 corresponding to the lower flange 214, and a remote edge 240 corresponding to the remote flange 216, for example, as shown in FIG. 4.

In some examples, as shown in FIGS. 3B and 3D, the seal stops 228 of the first and second retainers 132 and 134 may be configured be compressed by the edge profiles 226 of the respective first and second frame members 206 and 206 when the first and second frame members 206 and 208 are secured to the respective first and second retainers 132 and 134, for example, by fasteners. This may result in providing a relatively more effective dust- and/or fluid-resistant seal between the first and second frame members 206 and 208 and the first and second retainers 132 and 134. For example, as shown in FIGS. 3B and 3D, the seal stop 228 may include a first seal stop portion 242 extending in a first direction perpendicular to the first longitudinal axis FR of the first retainer 132, and a second seal stop portion 244 extending in a second direction oblique with respect to the first direction. In some examples, the first seal stop portion 242 may be configured to engage the upper edge 230 and/or the first edge portion 232 of the first or second frame members 206 or 208, and the second seal stop portion 244 may be configured to engage the second edge portion 234 and/or the third edge portion 236, and thus, provide a seal between the first seal stop portion 242 and a first portion of the end of the first and second frame members 206 and 208 (e.g., the upper edge 230 and/or the first edge portion 232) and between the second seal stop portion 244 and a second portion of the first and second frame members 206 and 208 (e.g., the second edge portion 234 and/or the third edge portion 236).

As shown in FIG. 4, the flange receiver 184 may be configured to engage and/or form a seal with the lower edge 238 and/or the remote edge 240 of the first and second frame members 206 and 208. For example, the flange receiver 184 may define a pair of receiver recesses 246, each configured to receive the lower edge 238 and/or the remote edge 240 of one of the first or second frame members 206 or 208, for example, as shown in FIG. 6.

Figure 5:
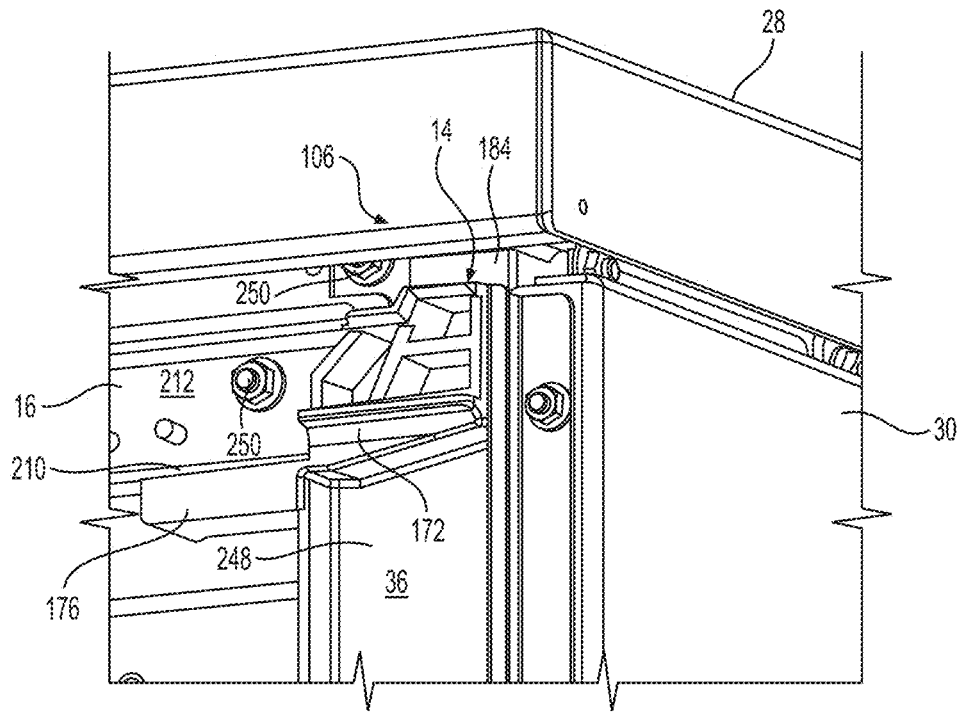
FIG. 5 is a schematic perspective view from an exterior side of an example upper corner bracket shown coupled to two example frame members, an example upper panel, and relative to example first and second door panels in the closed position with an outer skin of one of the door panels omitted to show a portion of the upper corner bracket.

FIG. 5 is a schematic perspective view from the exterior side 106 of an example corner bracket 14 shown coupled to two example frame members 16 (only one is visible in FIG. 5), an example top panel 28, and relative to the first door panel 30 and the second door panel 36 in the closed position, with an outer skin of the second door panel 36 omitted to show a portion of the corner bracket 14 and an interior member 248 of the second door panel 36. In the closed position, interior sides of the first door panel 30 and the second door panel 36 adjacent the corner bracket 14 abut the first door panel interface 138 and the second door panel interface 142 (see FIGS. 3B and 3D), respectively, such that a dust- and/or fluid-resistant seal is provided therebetween. In some examples, the first drainage channel 172 is configured to substantially align with a flange on an interior side of the second door panel 36. The lower flange 214 of the frame member 16 abuts against the first flange seal 176 (e.g., the first flange seal surface 178, FIGS. 3B and 3D). Although obscured from view by the first door panel 30, in some examples, the first door panel 30, the corner bracket 14, and the frame member hidden from view by the first door panel 30 may have similar configurations and/or relative orientations.

Figure 6:
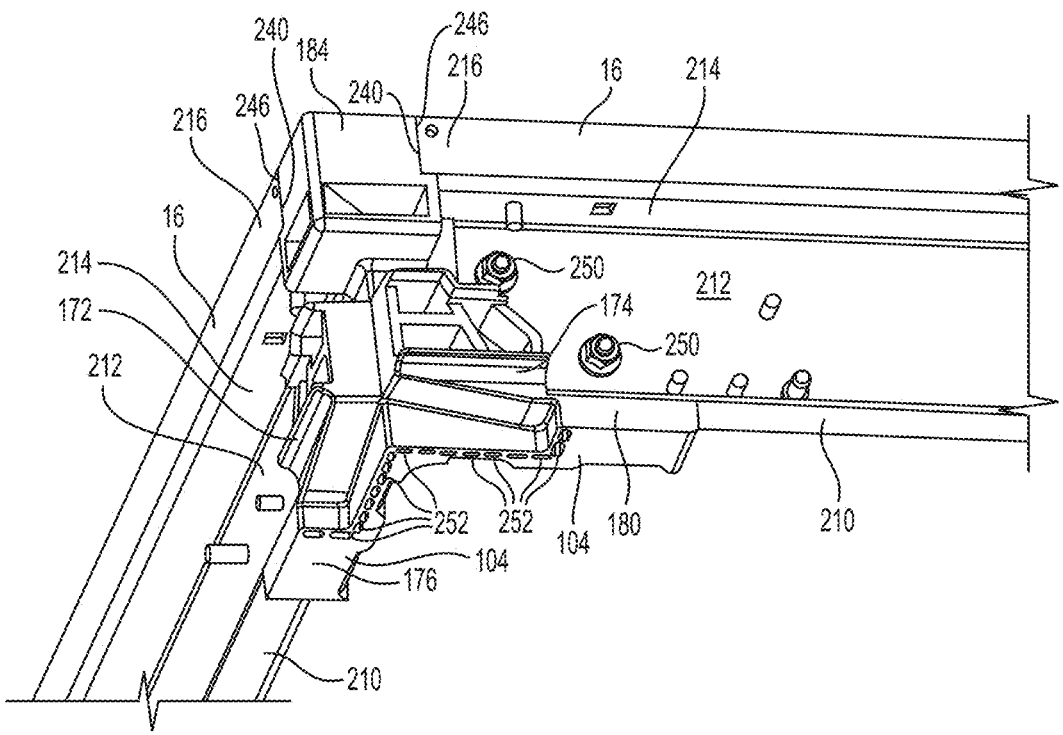
FIG. 6 is a schematic perspective view of an example joint including the example upper corner bracket shown in FIG. 5.

FIG. 6 is similar to FIG. 5, with the first and second door panels 30 and 36 omitted. As shown in FIG. 6, a pair of fasteners 250 couples the web 212 of the frame member 16 to the example corner bracket 14. In the example shown, the fasteners 250 include a bolt (e.g., a carriage bolt) and nut securing the bolt to the corner bracket 14 and the web 212, passing through the first and second apertures 148 and 152 (see FIGS. 3B and 3D). This configuration may be the same or similar for securing the other frame member 16 shown in FIG. 6 to the corner bracket 14.

Some examples of the corner bracket 14 may also include a plurality of small holes 252 in an underside of the sealing portion 104 of the corner bracket 14, for example, as shown in FIG. 6. The holes 252 may increase the flexibility of the sealing portion 104, which may permit the door panels to compress this portion of the sealing portion 104 when the door panels are closed, which may result in an improved dust- and/or fluid-resistant seal between the door panels and the corner bracket 14.

As shown in FIGS. 5 and 6, the example corner bracket 14 and example frame members 16 are inverted relative to the orientation of the example corner bracket 14 and example frame members 16 shown in FIG. 4. In some examples, the orientation shown in FIG. 4 is consistent with the corner bracket 14 serving as a lower corner bracket 14, for example, the lower corner bracket 84 shown in FIG. 2. In some examples, the orientation shown in FIGS. 5 and 6 is consistent with the corner bracket 14 serving as an upper corner bracket 14, for example, the upper corner bracket 76 shown in FIG. 2.

Figure 7A:
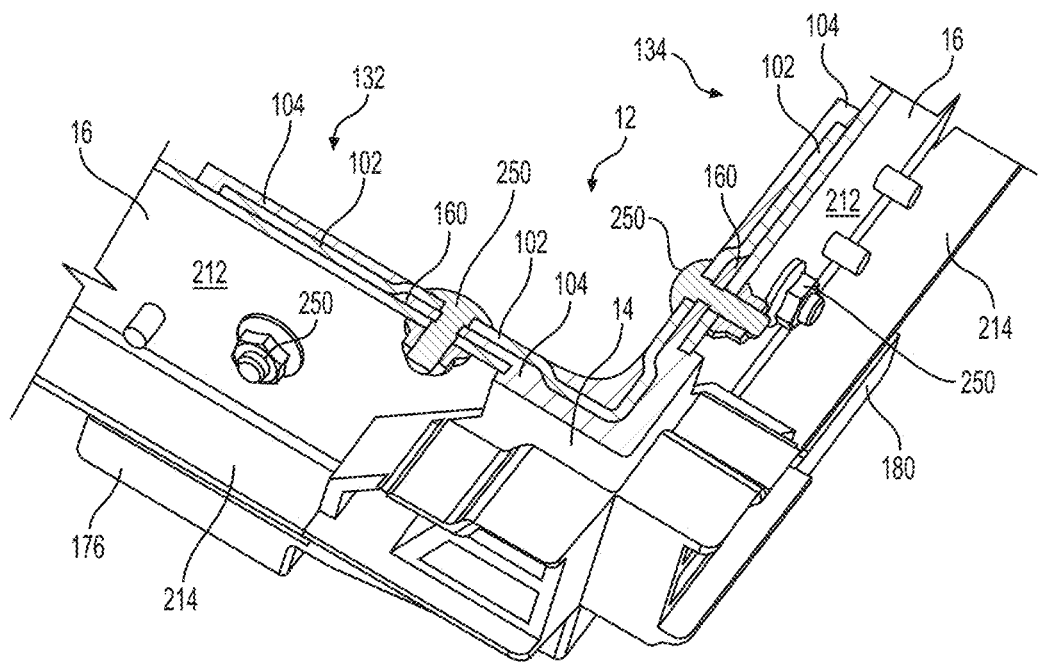
FIG. 7A is a schematic perspective partial section view showing a cross-section at a first location of an example corner bracket, example frame members, and example fasteners.
Figure 7B:
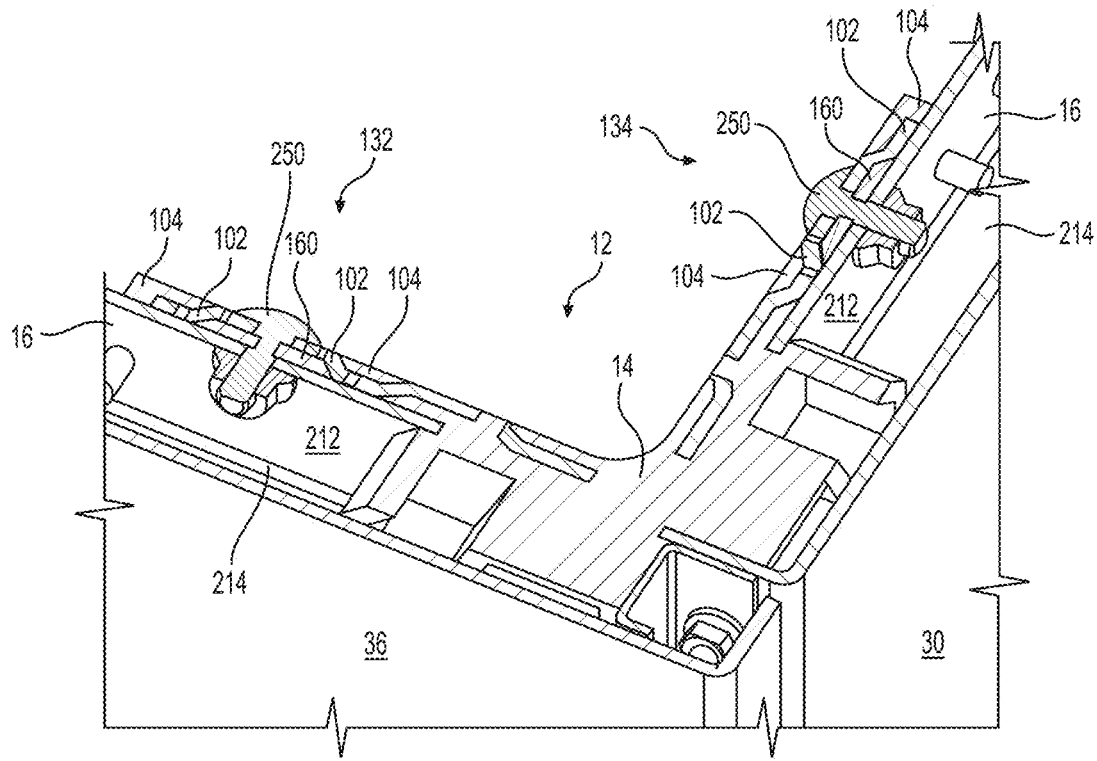
FIG. 7B is a schematic perspective partial section view showing a cross-section at a second location of the example shown in FIG. 7A.

FIGS. 7A and 7B are schematic perspective partial section views showing cross-sections at first and second locations of an example corner bracket 14, example frame members 16, and example fasteners 250. As shown in FIG. 7A, the fasteners 250 squeeze the respective webs 212 against the respective raised portions 160 of the sealing portion 104 of the example corner bracket 14, which surrounds the respective fasteners 250, the heads of which press directly against the structural portion 102 of the corner bracket 14. This example configuration may, in some examples, result in improving the dust- and/or fluid-resistant seal between the frame members 16 and the corner bracket 14. In addition, the structural portion 102 of the corner bracket 14 may provide a rigid coupling of the two frame members 16 to one another, such that they are substantially perpendicular with respect to one another. Similarly, as shown in FIG. 7B, the additional fasteners 250 squeeze the respective webs 212 against the respective raised portions 160 of the sealing portion 104 of the example corner bracket 14, which surrounds the respective additional fasteners 250, the heads of which press directly against the structural portion 102 of the corner bracket 14. This example configuration may, in some examples, result in improving the dust- and/or fluid-resistant seal between the frame members 16 and the corner bracket 14. FIG. 7B also shows the first and second door panels 30 and 36 in the closed position, such that they are substantially perpendicular with respect to one another. As shown in FIG. 7B, the first and second door panels 30 and 36, in the closed position, press against the against the sealing portion 104 (see FIGS. 3B and 3D) of the example corner bracket 14, thereby creating a substantially dust- and/or fluid resistant seal between the first and second door panels 30 and 36 and the corner bracket 14. This example configuration may result in a combination of (1) a rigid structural joining of the first and second frame members 16 to one another (e.g., without the additional support of an upright between the corresponding upper and lower corner brackets 14 of a frame 24), and (2) a substantially dust- and/or fluid-resistant seal between the frame members 16 and the corner bracket 14 and between the corner bracket 14 and the first and second door panels 30 and 36 when the first and second door panels 30 and 36 are in the closed position.

FIG. 8 is a schematic perspective view from the interior 18 of an example cabinet 10 showing an interior side of example upper corner bracket 14 and two example latch mechanisms 44, each including an example upper door latch 46 engaging example first and second latch receivers 200 and 204 of respective first and second latch recesses 198 and 202 in the sealing portion 104 of the corner bracket 14, for example, as shown and described herein with respect to FIG. 3C. As shown, the upper door latches 46 hold the first and second door panels 30 and 36 in the closed position, and in the example shown, each of the first and second door panels 30 and 36 includes interior edges 254. In some example, the interior edges 254 abut and press against the respective first and second flange seals 176 and 180, thereby creating respective first and second door panel interfaces configured to provide a substantially dust- and/or fluid-resistant seal between the first and second door panels 30 and 36 and the corner bracket 14 when the first and second door panels 30 and 36 are in the closed position. To open the first and second door panels 30 and 36, the latch mechanisms 44 may be operated such that the upper door latches 46 withdraw from the first and second latch receivers 200 and 204, thereby permitting each of the first and second door panels 30 and 36 to pivot from the closed position to an open position, for example, as shown in FIG. 1. In some examples, a corresponding lower corner bracket 14 may include at least some features at least similar to the features of the upper corner bracket 14 shown in FIG. 8.

Although this subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A corner bracket comprising:
a structural portion comprising at least one first material;
a sealing portion at least partially covering the structural portion and comprising at least one second material,
wherein the at least one first material is relatively more rigid than the at least one second material, and the at least one second material is relatively more elastic than the at least one first material;
a first retainer configured to receive an end of a first frame member, the first retainer at least partially comprising the at least one first material and defining a first longitudinal axis;
a second retainer coupled to the first retainer and defining a second longitudinal axis substantially perpendicular to the first longitudinal axis of the first retainer, the second retainer configured to receive an end of a second frame member such that the first frame member and the second frame member are substantially perpendicular with respect to one another when respectively received by the first retainer and the second retainer, and the second retainer at least partially comprising the at least one first material;
a first exterior surface at least partially defined by the first retainer and at least partially comprising the at least one second material, the first exterior surface comprising a first door panel interface configured to provide a seal between the first exterior surface and an interior surface of a first door panel in a closed position; and
a second exterior surface at least partially defined by the second retainer and at least partially comprising the at least one second material, the second exterior surface comprising a second door panel interface configured to provide a seal between the second exterior surface and an interior surface of a second door panel in a closed position, the first door panel interface and the second door panel interface substantially perpendicular with respect to one another;
wherein the first retainer comprises a first frame member interface configured to be coupled to the first frame member, and wherein the second retainer comprises a second frame member interface configured to be coupled to the second frame member; and
wherein the first frame member interface comprises a first aperture configured to receive a first fastener for coupling the first frame member to the first frame member interface, and wherein the sealing portion at least partially surrounds the first aperture and is configured to provide a first fastener seal between the first aperture and the first frame member.

2. The corner bracket of claim 1, wherein the sealing portion comprises a first raised portion surrounding the first aperture.

3. The corner bracket of claim 1, wherein the first retainer defines an interior surface opposite the first exterior surface, and wherein the interior surface comprises an interior side sealing face comprising the at least one second material, and wherein the interior side sealing face defines a fastener clearance portion surrounding the first aperture, the fastener clearance portion being substantially devoid of the at least one second material and configured to receive a first fastener head of the first fastener such that the first fastener head contacts the fastener clearance portion.

4. The corner bracket of claim 1, wherein at least one of the first exterior surface or the second exterior surface further comprises a sealing ridge comprising the at least one second material, wherein the sealing ridge is configured to be compressed by the end of one of the first frame member or the second frame member.

5. The corner bracket of claim 1, wherein at least one of the first retainer or the second retainer defines a face defining a channel extending substantially perpendicular to at least one of the first longitudinal axis of the second longitudinal axis, and wherein the at least one second material is received in the channel forming a compressible seal face configured to provide a seal between the at least one of the first retainer or the second retainer and the at least one of the first frame member or the second frame member.

6. The corner bracket of claim 5, wherein at least a portion of the face comprises a first structural face, wherein the first structural face is at least substantially devoid of the at least one second material and provides a first rigid support configured to abut a portion of the at least one of the first frame member or the second frame member.

7. The corner bracket of claim 1, wherein at least one of the first exterior surface or the second exterior surface comprises a drainage channel configured to drain fluid away from an interior side of the corner bracket opposite the at least one of the first exterior surface or the second exterior surface.

8. The corner bracket of claim 1, further comprising an interior surface opposite at least one of the first exterior surface or the second exterior surface, the interior surface defining a recess in the sealing portion exposing a latch receiver at least partially defined by the structural portion and configured to receive a door latch coupled to at least one of the first door panel or the second door panel.

9. The corner bracket of claim 1, wherein at least one of the first retainer or the second retainer comprises a panel interface configured to provide a seal between the at least one of the first retainer or the second retainer and a panel coupled to the first frame member and the second frame member.

10. The corner bracket of claim 1, wherein the first retainer and the second retainer are coupled to one another at an apex defining an apex axis extending perpendicular to first longitudinal axis and the second longitudinal axis, wherein the corner bracket further comprises a flange seal at an end of the corner bracket adjacent a first end of the apex, the flange seal defining a first flange seal surface comprising the at least one second material and configured to provide a seal with a portion of the end of at least one of the first frame member or the second frame member.

11. The corner bracket of claim 10, further comprising a flange receiver at a second end of the apex opposite the first end of the apex, wherein the flange receiver is configured to provide a seal between a portion of the end of at least one of the first frame member or the second frame member.

12. A corner joint comprising:
a first frame member defining a first longitudinal frame member axis;
a second frame member defining a second longitudinal frame member axis; and
a corner bracket coupling the first frame member and the second frame member to one another, such that the first frame member longitudinal axis and the second frame member longitudinal axis are substantially perpendicular with respect to one another, the corner bracket comprising:
a first retainer coupled to an end of the first frame member, the first retainer at least partially comprising at least one first material and defining a first longitudinal axis;
a second retainer coupled to the first retainer and defining a second longitudinal axis substantially perpendicular to the first longitudinal axis of the first retainer, the second retainer coupled to an end of the second frame member such that the first frame member and the second frame member are substantially perpendicular with respect to one another when respectively received by the first retainer and the second retainer, and the second retainer at least partially comprising the at least one first material;
a first exterior surface at least partially defined by the first retainer and at least partially comprising at least one second material, the first exterior surface comprising a first door panel interface configured to provide a first seal between the first exterior surface and an interior surface of a first door panel in a closed position, wherein the at least one first material is relatively more rigid than the at least one second material, and the at least one second material is relatively more elastic than the at least one first material; and
a second exterior surface at least partially defined by the second retainer and at least partially comprising the at least one second material, the second exterior surface comprising a second door panel interface configured to provide a second seal between the second exterior surface and an interior surface of a second door panel in a closed position, the first door panel interface and the second door panel interface substantially perpendicular with respect to one another;
wherein the first retainer comprises a first frame member interface configured to be coupled to the first frame member, and wherein the second retainer comprises a second frame member interface configured to be coupled to the second frame member; and
wherein the first frame member interface comprises a first aperture configured to receive a first fastener for coupling the first frame member to the first frame member interface, and wherein a sealing portion at least partially surrounds the first aperture and is configured to provide a first fastener seal between the first aperture and the first frame member.

13. The corner joint of claim 12, wherein the corner bracket comprises:
a structural portion comprising the at least one first material; and
the sealing portion at least partially covering the structural portion and comprising the at least one second material.

14. The corner joint of claim 12, wherein the first retainer comprises the first frame member interface coupled to the first frame member, wherein the first frame member interface comprises the first aperture receiving a first fastener coupling the first frame member to the first frame member interface, and wherein the sealing portion is the at least one second material and at least partially surrounds the first aperture and is configured to provide the first fastener seal between the first aperture and the first frame member.

15. The corner joint of claim 14, wherein the first retainer comprises a structural portion comprising the at least one first material, and wherein the first fastener seal comprises a first raised portion surrounding the first aperture and configured to be compressed between the first frame member the structural portion.

16. The corner joint of claim 12, wherein the corner bracket further comprises a first interior surface opposite the first exterior surface, the first interior surface defining a first recess in the at least one second material exposing a first latch receiver at least partially defined by the at least one first material and configured to receive a first door latch coupled to the first door panel.

17. The corner joint of claim 12, wherein the first retainer comprises the first frame member interface coupled to the first frame member, wherein the first frame member interface comprises the first aperture receiving a first fastener coupling the first frame member to the first frame member interface, wherein the first retainer defines a first interior surface opposite the first exterior surface, wherein the first interior surface comprises a first interior side sealing face comprising the at least one second material, and wherein the first interior side sealing face defines a first fastener clearance portion surrounding the first aperture, the first fastener clearance portion being substantially devoid of the at least one second material and receiving a first fastener head of the first fastener, such that the first fastener head contacts the first fastener clearance portion.

18. A frame defining an interior and an exterior, the frame comprising:
an upper back frame member;
an upper first side frame member coupled to upper back frame member at a first upper corner;
an upper front frame member;
an upper corner bracket coupled to the upper first side frame member and the upper front frame member;
a lower back frame member;
a lower first side frame member coupled to the lower back frame member at a first lower corner;
a lower front frame member;
a lower corner bracket coupled to the lower first side frame member and the lower front frame member;
a first upright coupled to the upper back frame member and the upper first side frame member at the first upper corner; and
a second upright coupled to the upper front frame member at an upper coupling location and the lower front frame member at a lower coupling location, wherein the upper coupling location is spaced from the upper corner bracket and the lower coupling location is spaced from the lower corner bracket,
wherein the frame defines an open space between the upper corner bracket and the lower corner bracket, the open space devoid of any structural member extending between the upper corner bracket and the lower corner bracket, and
wherein the upper corner bracket comprises:
a first retainer coupled to an end of the upper first side frame member, the first retainer at least partially comprising at least one first material and defining a first longitudinal axis;
a second retainer coupled to the first retainer and defining a second longitudinal axis substantially perpendicular to the first longitudinal axis of the first retainer, the second retainer coupled to an end of the upper front frame member such that the upper first side frame member and the upper front frame member are substantially perpendicular with respect to one another when respectively received by the first retainer and the second retainer, and the second retainer at least partially comprising the at least one first material;
a first exterior surface at least partially defined by the first retainer and at least partially comprising at least one second material, the first exterior surface comprising a first door panel interface configured to provide a first seal between the first exterior surface and an interior surface of a first door panel in a closed position, wherein the at least one first material is relatively more rigid than the at least one second material, and the at least one second material is relatively more elastic than the at least one first material; and
a second exterior surface at least partially defined by the second retainer and at least partially comprising the at least one second material, the second exterior surface comprising a second door panel interface configured to provide a second seal between the second exterior surface and an interior surface of a second door panel in a closed position, the first door panel interface and the second door panel interface substantially perpendicular with respect to one another;
wherein the first retainer comprises a first frame member interface configured to be coupled to the upper first side frame member, and wherein the second retainer comprises a second frame member interface configured to be coupled to the upper front frame member; and
wherein the first frame member interface comprises a first aperture configured to receive a first fastener for coupling the upper first side frame member to the first frame member interface, and wherein a sealing portion at least partially surrounds the first aperture and is configured to provide a first fastener seal between the first aperture and the upper first side frame member.

19. The frame of claim 18, wherein the upper corner bracket and the lower corner bracket have substantially the same structure.

20. The frame of claim 18, wherein at least one of the upper corner bracket or the lower corner bracket comprises:
a structural portion comprising the at least one first material; and
the sealing portion at least partially covering the structural portion and comprising the at least one second material.

21. A cabinet defining an interior and an exterior, the cabinet comprising:
the frame of claim 18;
a back panel coupled to at least one of the upper back frame member, the first upright, or the lower back frame member;
a top panel coupled to at least one of the upper back frame member, the upper first side frame member, or upper front frame member;
a first hinge coupled to the first upright and providing a first pivot axis;
a second hinge coupled to the second upright and providing a second pivot axis;
a first door panel coupled to the first hinge and configured to pivot about the first pivot axis between an open position permitting access to the interior of the cabinet and a closed position in which an interior side of the first door panel contacts the upper corner bracket, the lower corner bracket, and at least one of the upper first side frame member or the lower first side frame member; and a second door panel coupled to the second hinge and configured to pivot about the second pivot axis between an open position permitting access to the interior of the cabinet and a closed position in which an interior side of the second door panel contacts the upper corner bracket, the lower corner bracket, and at least one of the upper front frame member or the lower front frame member.

22. The cabinet of claim 21, further comprising a first latch mechanism coupled to the interior side of the first door panel and comprising a first door latch configured to secure the first door panel in the closed position, wherein at least one of the upper corner bracket or the lower corner bracket comprises a first interior surface opposite the first exterior surface, the first interior surface defining a first recess in the at least one second material exposing a first latch receiver configured to receive the first door latch.

23. The cabinet of claim 22, further comprising a second latch mechanism coupled to the interior side of the second door panel and comprising a second door latch configured to secure the second door panel in the closed position, wherein at least one of the upper corner bracket or the lower corner bracket comprises a second interior surface opposite the second exterior surface, the second interior surface defining a second recess in the at least one second material exposing a second latch receiver configured to receive the second door latch.

* * * * *